(12) United States Patent
Gusev

(10) Patent No.: US 9,996,269 B2
(45) Date of Patent: Jun. 12, 2018

(54) LOW-LATENCY SIGNATURE/HASH CALCULATION OF A STREAM OF DATA BLOCKS

(71) Applicant: Dmitriy Gusev, Puteaux (FR)

(72) Inventor: Dmitriy Gusev, Puteaux (FR)

(*) Notice: Subject to any disclaimer, the term of this patent is extended or adjusted under 35 U.S.C. 154(b) by 136 days.

(21) Appl. No.: 15/078,275

(22) Filed: Mar. 23, 2016

(65) Prior Publication Data

US 2016/0283133 A1    Sep. 29, 2016

Related U.S. Application Data

(60) Provisional application No. 62/136,966, filed on Mar. 23, 2015.

(51) Int. Cl.
*G06F 3/06* (2006.01)

(52) U.S. Cl.
CPC .......... *G06F 3/0608* (2013.01); *G06F 3/0641* (2013.01); *G06F 3/0688* (2013.01)

(58) Field of Classification Search
None
See application file for complete search history.

(56) References Cited

U.S. PATENT DOCUMENTS

| 2011/0246741 | A1* | 10/2011 | Raymond | G06F 17/30159 711/170 |
| 2012/0159289 | A1* | 6/2012 | Piccirillo | G06F 1/30 714/799 |
| 2014/0304464 | A1* | 10/2014 | Bert | G06F 3/0641 711/105 |

* cited by examiner

*Primary Examiner* — Brian R Peugh
*Assistant Examiner* — Dustin Bone
(74) *Attorney, Agent, or Firm* — Oliff PLC

(57) ABSTRACT

Method including receiving first and second identification data relative to data blocks to be transmitted via data bus between processor and system memory. Listening data transmitted via data bus to detect block data corresponding to the first or second identification data; storing in a first location of temporary storage a first data block transmitted via bus and corresponding to first identification data; storing in a second location of temporary storage a second data block transmitted via bus and corresponding to the second identification data. The storing of the first and second data blocks being performed without disturbing transfer of the first and second data blocks via data bus. When the first and/or second data blocks are stored in the temporary storage activating their respective signature calculator connected to the location of the temporary storage to compute a signature of the data block, and storing the signature in a result memory.

17 Claims, 3 Drawing Sheets

LOW-LATENCY SIGNATURE/HASH CALCULATION OF A STREAM OF DATA BLOCKS

CROSS-REFERENCE TO RELATED APPLICATION

This nonprovisional application claims the benefit of U.S. Provisional Application No. 62/136,966, filed Mar. 23, 2015. The disclosure of the prior application is hereby incorporated by reference herein in its entirety.

FIELD OF THE INVENTION

The presented invention applies to the domain of high-performance SSD (solid state disk), and more particularly to a deduplication functionality embedded into such a SSD. The present invention also applies to signature calculation and to deduplication algorithms in other types of data storage and may also be used for performing other calculations over data blocks, such as checksums, CRC (Cyclic Redundancy Check), hashes for archiving, etc.

Deduplication algorithms are implemented in order to reduce the data footprint stored in a memory.

Deduplication is preferably performed transparently (i.e. without any control) to the host system. Such a requirement presents a technical challenge: the hardware and software onboard of the deduplicated SSD should be able to perform deduplication at the speed of SSD main data interface. High-speed and low latency disk reads and writes are especially important for tasks such as enterprise databases, financial transactions management, telecom billing and others.

Modern PCIe-based SSDs are able to perform in the order of hundreds of thousands IO operations per second, the deduplication should be performed at least as fast.

The deduplication algorithms have been known for a long time (see [1], [2], [3]) and have been used in industry primarily inside backup ([5], [6]) storage solutions. The reason is that backup storage benefit a lot from better data density offered by deduplication and at the same time, backup typically does not require real-time performance and low access latencies.

The domain of the invention is not limited to disk drives and in particularly Flash-based drives (SSD). Similar processing principles can be applied to other domains where the need to perform real-time calculation on fixed-size data blocks exists. The example is database processing: the function that calculates some statistics (mean value, mean square etc. . . . ) over the contents of a data block. Deduplication algorithms are well described in literature ([2], [3]). In most common implementations, the typical deduplication algorithm can be split into three distinctive stages:

chunking, signature calculation, and signature search, decision and chunk table update.

Chunking is absent if storage uses fixed-size chunks or data blocks. The invention concerns the signature calculation stage. The latency of each stage adds up (plus the storage media access latency) to form the total access latency of the storage device. It is critical for high-performance to achieve the minimum latency.

Deduplication distinguishes IO data blocks by comparing block signatures (or "fingerprints"). The signature should be calculated as a function only of block data, and it should be unique (meaning that the algorithm for signature calculation should give very low probability of collisions: different IO blocks generating same signature).

Known software deduplication solutions ([7], [8]) not only are very demanding on computational resources but also exhibit rather long signature calculation latencies (~100 μs). Such long latencies render software implementations of deduplication impractical for high-speed SSDs.

The signature is calculated over an IO block before the deduplication performs any operation over the block. Therefore, the signature calculation is very critical in terms of latency: the signature calculation latency adds directly to the overall read/write latency of an IO block device and impacts overall system performance; it should be performed in a time as short as possible.

Embedded hardware accelerators performing hash calculations have been already proposed to reduce signature calculation latency. An example of system architecture is shown in FIG. 1. Commonly known embedded hardware accelerators are of the following types:

Internal memory—the processor sends an IO block to a Hash calculator which executes the signature calculation algorithm and stores the resultant signature in internal registers accessible by the processor; and DMA-based calculators—the processor provides the address of an IO block stored in a main memory to a DMA (Direct Memory Access) implemented inside the Hash calculator. The DMA fetches data from main memory, and provides them to the Hash calculator. The resultant signature is stored in internal registers accessible by processor.

In both cases, the Hash calculator uses connections inside an interconnect matrix of the system as shown in FIG. 1. Two data transfers within the interconnect matrix are necessary in order to send data to its location in the system memory and to calculate a hash value.

It is therefore desirable to reduce latency and minimize the data transfers in the system. It is also desirable to let the system running at a full bandwidth.

SUMMARY OF THE INVENTION

Embodiments relate to a method comprising: receiving first and second identification data relative to data blocks to be transmitted via a data bus between a processor and a system memory; listening data transmitted via the data bus to detect a block data corresponding to the first or second identification data; storing in a first location of a temporary storage a first data block transmitted via the bus and corresponding to the first identification data; storing in a second location of the temporary storage a second data block transmitted via the bus and corresponding to the second identification data, the storing of the first and second data blocks being performed without disturbing transfer of the first and second data blocks via the data bus; when the first data block is stored in the temporary storage, activating a first signature calculator connected to the first location of the temporary storage to compute a first signature of the first data block, and storing the first signature in a result memory; and when the second data block is stored in the temporary storage, activating a second signature calculator connected to the second location of the temporary storage to compute a second signature of the second data block, and storing the second signature in a result memory.

According to an embodiment, the method comprises storing N data blocks in the temporary storage and performing simultaneously by a respective signature calculator a signature calculation of each of the N data block in the temporary storage, N being such that each signature calculation taking a time shorter than a time to transmit N−1 data blocks via the data bus, all the data blocks transmitted via the data bus having a size smaller than a maximum size.

According to an embodiment, the method comprises setting available a location of a data block in the temporary storage when a signature of the data block is computed.

According to an embodiment, the data block identification data comprise at least one of an address of the data block in the system memory, a data block length, and a data block transfer direction.

According to an embodiment, the signature calculation is performed according to one of the following algorithms SHA-1, SHA-160, SHA-256, SHA-512, MD5.

According to an embodiment, the method further comprises transferring each signature stored in the result memory in a signature table stored in the system memory, such that each data block stored in the system memory corresponds with a signature stored in the signature table.

According to an embodiment, the transfer of a signature from the result memory to the system memory is performed as soon as the signature is computed and stored in the result memory by a signature calculator.

According to an embodiment, the transfer of a signature from the result memory to the system memory is performed via a separate interface without using the data bus.

According to an embodiment, the method further comprises storing block data in the system memory such that all the block data stored in the system memory have distinct signatures.

Embodiments relates to a device for computing signatures of data blocks transferred via a data bus connecting a processor to a system memory, the device comprising: a temporary storage for storing data blocks, a bus snooper connected to the data bus and configured to listen to data transferred via the system bus without disturbing transfer of the data between the processor and the system memory, and to transfer to the temporary storage a copy of data blocks transferred via the bus and corresponding to identification data, several signature calculators each corresponding to a respective data block storage of the temporary storage, each signature calculators being configured to compute a signature of a data block stored in the corresponding data block storage, as soon as a new data block is present in the corresponding data block storage, and to store each computed signature in a result memory.

According to an embodiment, the result storage is configured to store several signatures for each signature calculator.

According to an embodiment, each signature calculator is configured to compute a signature according to one of the following algorithms SHA-1, SHA-160, SHA-256, SHA-512, MD5.

According to an embodiment, the temporary storage comprises N data block storage locations, the device comprising N signature calculators coupled to a respective data block storage location in the temporary storage, N being such that each signature calculation taking a time shorter than a time to transmit N−1 data blocks via the data bus, all the data blocks transmitted via the data bus having a size smaller than a maximum size.

According to an embodiment, the data block identification data comprise at least one of an address of the data block in the system memory, a data block length, and a data block transfer direction.

According to an embodiment, the device further comprises a separate interface to transfer signatures from the result memory to the system memory.

According to an embodiment, the device further comprises a status register storing at least one of a number of processed data blocks and a number of computed signatures.

BRIEF DESCRIPTION OF THE DRAWINGS

The methods and systems in accordance with the present invention are further described with reference to the accompanying drawings in which.

DETAILED DESCRIPTION OF THE INVENTION

Figure 1:
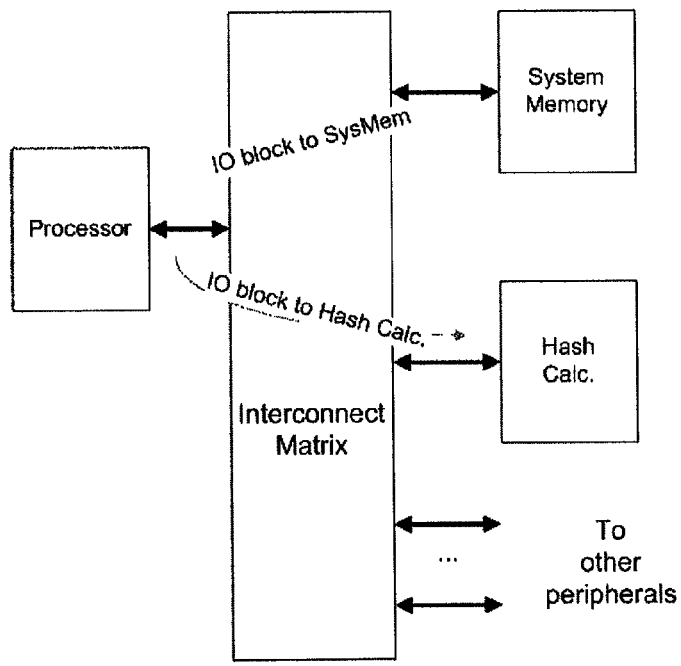
FIG. 1 is a block diagram representing a conventional system architecture comprising a Hash calculator for computing signatures of data block stored in a memory.
Figure 2:
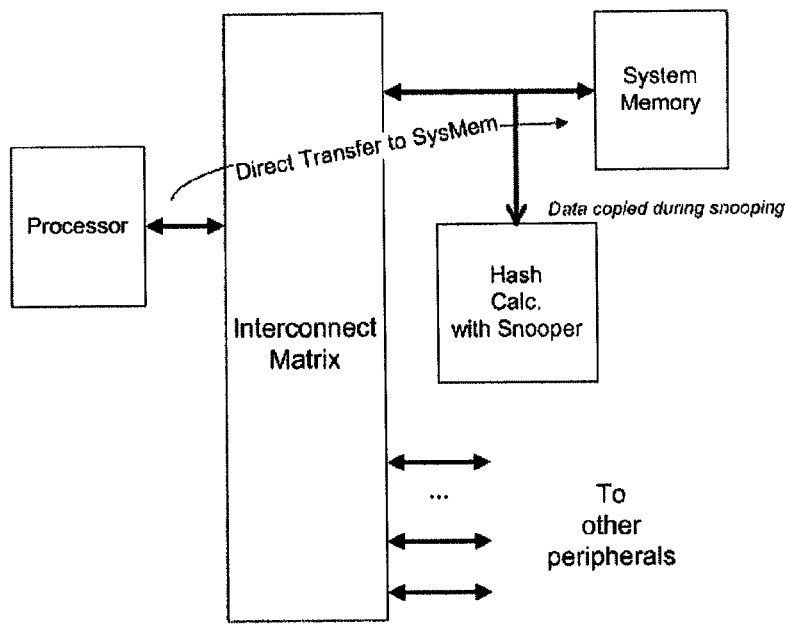
FIG. 2 is a block diagram representing a system architecture comprising a Hash module for computing signatures of data block stored in a memory, according to an embodiment.

In FIG. 2, a Hash module is built around a bus snooping device that is connected to the system memory bus. The snooping device sees all the transactions passing to and from system memory. It can capture IO data at the same time as they are stored in system memory. This architecture has two main advantages over conventional systems:

only one data transfer (to memory destination) is performed, and minimum latency is achieved.

The hash calculation is mathematically complex and a relatively slow operation. It is much slower than the time to transfer an IO block to its destination in memory. As the data appear only once on the system bus, they should be captured when they appear without stopping system data transfers. Stopping transfers by the data bus would greatly decrease overall system performance).

Figure 3:
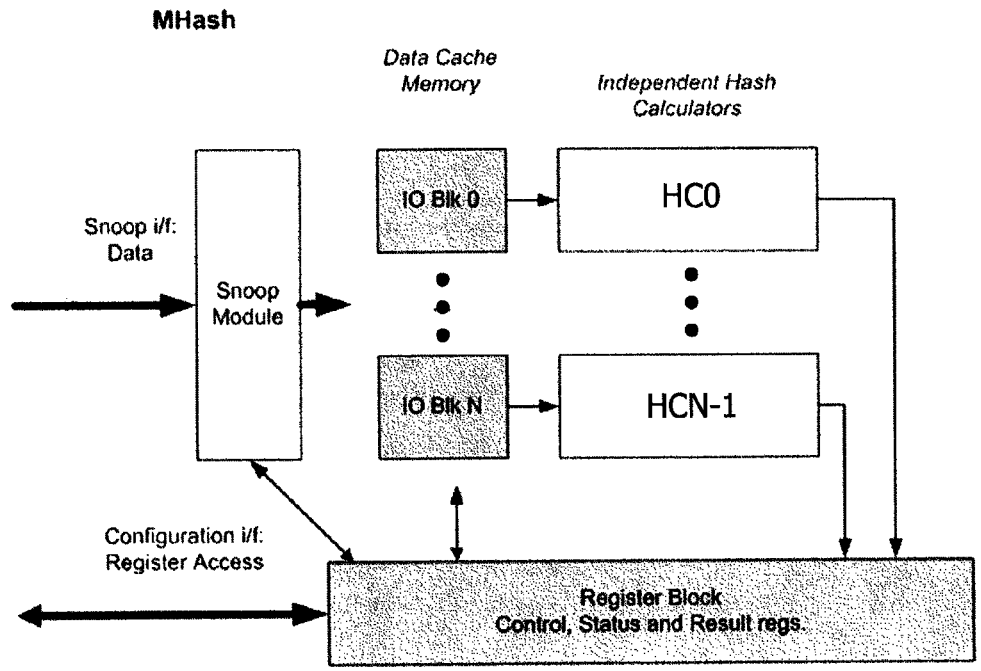
FIG. 3 is a block diagram representing the Hash module according to an embodiment.

The Hash module MHash is shown in FIG. 3. The Hash module comprises the following building blocks:

a Bus Snoop module, an internal Data Cache memory, several Hash calculators. HC0-HCN−1, and a register Block.

The task of the Bus Snoop module is to observe on-going transactions over system bus or bus segment and capture the data corresponding to snoop configuration parameters. The snoop configuration parameters consists of the following parameters:

target address in system memory of the data block, data block length (expressed either in the number of bytes or in the number of data blocks to be captured), and transfer direction (read or write).

When the Bus Snoop module sees data corresponding to the snoop configuration parameters on the system bus, it captures such data and copies them into the Data Cache memory on the fly. The system bus can be for example of the type AMBA or AXI. The Bus Snoop module is configured to capture data on-the-fly on the system bus without affecting bus functioning in any way.

When the end of the data block to be captured is reached, the bus snoop module stops and waits for another input from software.

Example: Target Address=0x40000, IO data block length=6 (each IO data block length=512 bytes), direction=Write. This configuration means that the Snoop Module looks for a write operation to system memory to address 0x40000. When such a write operation happens, it captures all bytes starting from the address 0x40000 and ending at the address 0x401ff (512 bytes) as the first IO data block bytes and from address 0x40200 to 0x403ff as the second one etc. Data snooping and capturing stops when the last address defined by the snoop parameters (i.e. 0x40bff) is reached.

The IO Data blocks to be captured by the snoop module should reside continuously in the system memory. In order to avoid this limitation, an input gather DMA can be implemented (see below).

The internal Data Cache memory serves as a temporary storage for data blocks captured by the Bus Snoop module. Data blocks are stored in the cache memory until their signatures are calculated. The Data Cache memory should store at least one IO data block for each Hash Calculator HC0-HCN−1. Physically, the Data Cache memory may be implemented as a single contiguous memory block or as several separate memory blocks (depending upon implementation environment: ASIC, FPGA . . . )

Each of the Hash calculators is configured to execute a signature or hash calculation over one IO data block at the time. Hash calculators are independently started; they also function in completely independent manner from one another. Each Hash calculator HC0-HCN−1 retrieves data from a corresponding Cache memory block IO Blk 0-N (or a segment inside Cache Memory if the latter is implemented as a single contiguous block). The hash calculation is always performed over a whole data block, and starts as soon as a last byte of the data block is captured in the data cache memory.

The Register Block is accessed via a separate bus interface and comprises control, status and result registers. Control registers may include snoop configuration and start/stop control. Status registers return information such as the number of processed IO data blocks, and the number of calculated hashes or signatures. The calculated signatures are stored in the result registers. Each Hash calculator HC0-HCN−1 has its own set of result registers. Result registers can be accessed by the processor at any time in order to retrieve the calculated signatures. The signatures written to results registers can be retrieved by the processor and passed down the processing chain.

According to an exemplary implementation, the SHA160 algorithm is chosen for computing signatures of the IO blocks. SHA algorithms are well-known algorithms ([4]) with very low collision probability. The Hash calculators HC0-HCN−1 are configured to compute a 160-bit signature from every incoming 4 KB IO data block. However, the actual IO block size does not matter. Storage devices use various block sizes such as 512 bytes, 8 KB and others.

All implementation details above-presented apply to other hash algorithms and any other IO data block size as well. Other additional features could be implemented to simplify and accelerate result management. The simplest solution is to store the computed signatures in the result registers (inside the register block). The result registers are accessed by the software to recover the computed signatures from time to time. The software may access these registers during precise time windows in order to read correct values.

In the following, other additional features could be implemented for minimizing software intervention.

Instead of result registers, the computed signatures are written into a result memory block implemented inside the hash module MHash. The result memory block may be located inside the Register block and can be accessed by software via a register interface. This feature greatly increases the time window of results availability. Also, the result memory can be accessed more efficiently (using long burst transfers) than individual result registers.

Every time a signature is calculated, an internal DMA engine sends it from the hash result registers or memory block to a result table in a predefined location of the system memory. The signatures are transferred via a separate interface. The processor may then access signatures directly in the system memory. The Hash module implements a signature counter accessible by the processor and providing a number a calculated signatures.

In systems that do not comprise a separate interface, e.g. with a single memory controller, all data transfers (incoming data blocks and signatures) are routed via a same interconnect. In such systems, different priorities can be assigned to signature transfers and data transfers, for performance reasons. For example, the priority assigned to signature transfers can be lower than the priority assigned of data transfers.

Figure 4:
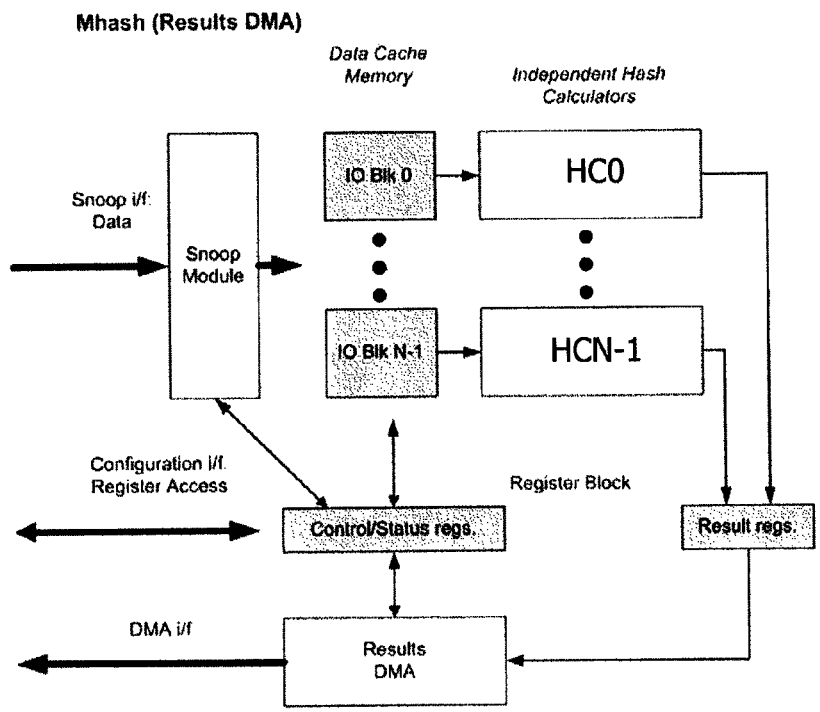
FIG. 4 is a block diagram representing the Hash module according to another embodiment.

FIG. 4 represents another embodiment Hash module MHash. This DMA can be used for gathering IO Data blocks residing in non-continuous memory addresses. Such DMA can be controlled using an extended snoop configuration:

configuration pointer register points to the location in memory where a list descriptor table is stored, a table length register stores a number of descriptors in the list descriptor table, and each descriptor describes one continuous block in the system memory where IO data blocks reside. Each descriptor comprises a base address and a length of the block.

Smooth and efficient operation of the Hash module MHash may be achieved using the following event flow:

the processor provides the snoop parameters as above-described and starts the Hash module MHash;

the Hash module MHash starts snooping IO data;

snooped IO data are filled in the cache memory (starting from block 0 in the cache memory);

once a data block is fully filled in the cache memory, a corresponding Hash calculator HC0-HCN−1 starts automatically. A block counter status register is incremented to indicate the number of captured IO data blocks;

once a signature calculation finishes, the signature counter status register is incremented; and the snooping of the data bus stops once the last byte indicated by the snoop parameters is captured. Signature processing stops once the number of captured IO data blocks equals the number of calculated signatures. A system interrupt may be issued to inform the processor of such event.

Figure 5:
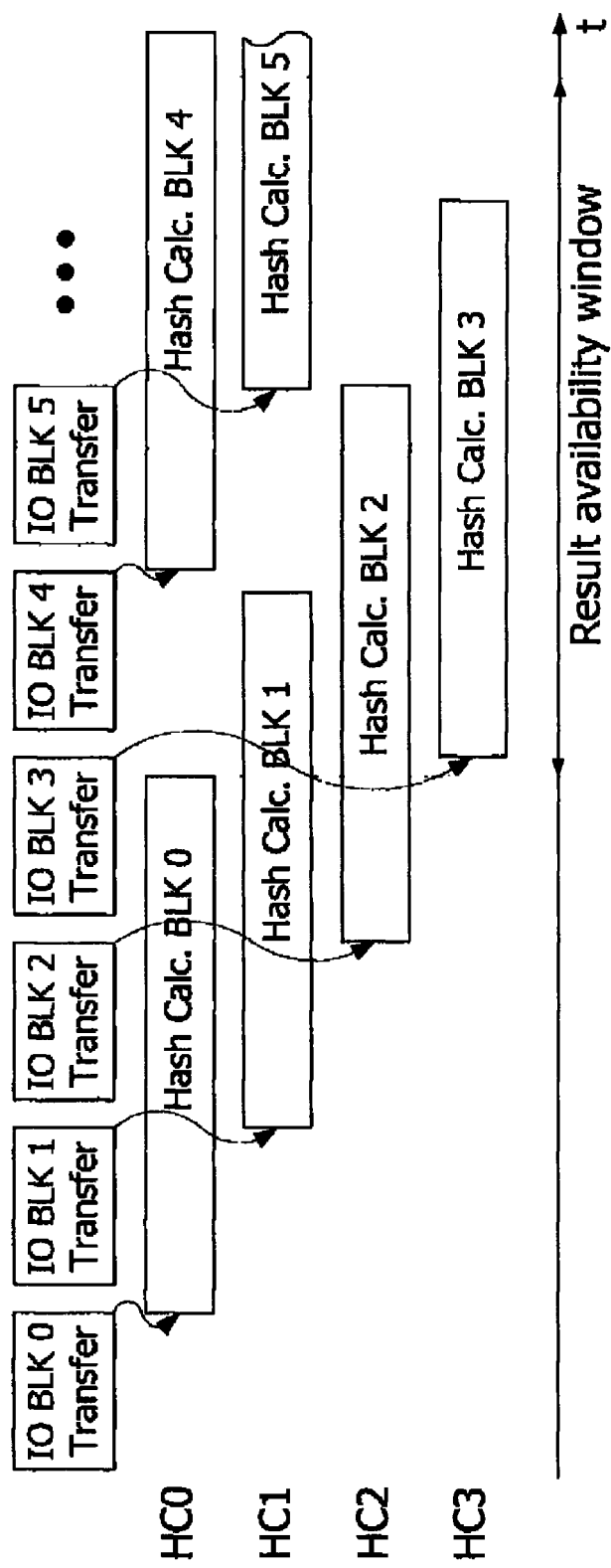
FIG. 5 is a timing diagram illustrating the operation of the Hash module, according to an embodiment.

FIG. 5 shows an example of the sequence of events and signature calculation times, when four hash calculators HC0-HC3 are used. It should be noted that the result registers contain valid information during a results availability window which lasts from the end of one signature calculation until the end of the following one. The minimum duration of the availability window is therefore equal to the one signature calculation time. If the result of a signature calculation is not read by the processor during its availability window, this result is lost. The processor may employ a tracking strategy to periodically access the results registers to recover results (the implementation of the results DMA frees system designer of such a constraint).

In order for system to be balanced, hash calculation should take no longer than the time it takes to transmit N−1 data blocks over the system bus, where N is the number of independent calculators HC0-HC3 in the Hash module). This avoids a potential memory conflict where an incoming IO block has to be written over an existing IO block in the cache memory and the hash calculation over the latter is not yet finished. Provided that this requirement is satisfied, the system can run at full bandwidth for an indefinite period of time (see below for result storing requirements).

Actual transfer and calculation times may greatly vary; they depend among others on the following parameters:
system bus width,
system bus clock speed, and
Hash module architecture and clock speed.

The Hash module may be configured to calculate the number of IO blocks programmed in a control registers (other approaches are also possible such as go until stop arrives etc.)

The present invention can also be applied to other domains requiring fast signature calculation over data blocks of fixed size, such as, but not limited to:
data watermarking, intrusion detection
cryptography
duplicate records search
bloom filter implementations

LIST OF PRIOR ART REFERENCES
(INCORPORATED AS REFERENCES)

[1] N. Mandagere, Pin Zhou, Mark A Smith, S. Uttamchandani, Demystifying data deduplication, Proceedings of the ACM/IFIP/USENIX Middleware '08
[2] F. Guo and P. Efstathopoulos. Building a high-performance deduplication system. In USENIX-ATC'11: Proceedings of the 2011 USENIX Conference on USENIX annual technical conference 2011
[3] B. Debnath, S. Sengupta, Jin Li, ChunkStash: Speeding up Inline Storage Deduplication using Flash Memory, Proceedings of 2010 USENIX Annual Technical Conference (ATC), June 2010
[4] National Institute of Standards and Technology, "Secure Hash Standard," FIPS 180-1, April 1995. [Online]. Available: http://www.itl.nist.gov/fipspubs/fip180-1.htm
[5] L. L. You and C. Karamanolis, "Evaluation of efficient archival storage techniques," in Proceedings of the 21st IEEE/12th NASA Goddard Conference on Mass Storage Systems and Technologies, April 2004
[6] U.S. Pat. No. 8,315,985 B1 Nov. 20, 2012. Optimizing The Deduplication Rate For a Backup Stream, James Ohr et al
[7] M. Peters, S. Duplessie, Permabit Albireo: Primary Data Deduplication That's Primarily About Massive Business Value, Enterprise Strategy Group, White Paper, August 2011
[8] U.S. Pat. No. 8,463,742, Jun. 11, 2013 Managing deduplication of stored data, Jered Floyd et al.

What is claimed is:

1. A method comprising:
receiving identification data relative to data blocks to be transmitted via a data bus between a processor and a system memory;
listening for data transmitted via the data bus to detect data blocks corresponding to the identification data;
each time a data block transmitted via the data bus corresponds to one of the identification data, storing the data block in a respective location of a temporary storage, the listening of the data and the storing of the data blocks being performed without disturbing transmission of the data blocks via the data bus; and
each time the data block is stored in one of the locations of the temporary storage, activating a respective signature calculator connected to the location of the temporary storage to compute a signature of the data block, and storing the computed signature in a result memory, the temporary storage having N locations for storing N data blocks, each of the N locations being connected to a respective signature calculator, and N being such that each signature calculation takes a time shorter than a time to transmit N−1 data blocks via the data bus.

2. The method of claim 1, wherein each of the data blocks transmitted via the data bus has a size smaller than a maximum size.

3. The method of claim 1, further comprising:
setting to an available state a location of a data block in the temporary storage when a signature of the data block is computed, the location in the temporary storage in the available state being ready to receive a new data block.

4. The method of claim 1, wherein the data block identification data comprise at least one of an address of the data block in the system memory, a data block length, and a data block transfer direction.

5. The method of claim 1, wherein the signature calculation is performed according to one of the following algorithms SHA-1, SHA-160, SHA-256, SHA-512, MD5.

6. The method of claim 1, further comprising:
transferring each signature stored in the result memory in a signature table stored in the system memory, such that each data block stored in the system memory corresponds with a signature stored in the signature table.

7. The method of claim 6, wherein the transfer of a signature from the result memory to the system memory is performed as soon as the signature is computed and stored in the result memory by a signature calculator.

8. The method of claim 7, wherein the transfer of a signature from the result memory to the system memory is performed via a separate interface without using the data bus.

9. The method of claim 1, further comprising:
storing block data in the system memory such that all the block data stored in the system memory have distinct signatures.

10. A device for computing signatures of data blocks transferred via a data bus connecting a processor to a system memory, the device comprising:
a temporary storage having N locations for storing N data blocks,
a bus snooper connected to the data bus and configured to listen to data transferred via the system bus without disturbing transfer of the data between the processor and the system memory, and to transfer to the temporary storage a copy of data blocks transferred via the bus and corresponding to identification data,
N signature calculators each corresponding to a respective location of the temporary storage, each signature calculators being configured to compute a signature of a data block stored in the corresponding location, as soon as a new data block is present in the corresponding location, and to store each computed signature in a result memory, N being such that each signature calculation performed by the signature calculators takes a time shorter than a time to transmit N−1 data blocks via the data bus.

11. The device of claim 10, wherein the result storage is configured to store several signatures for each signature calculator.

12. The device of claim 10, wherein each signature calculator is configured to compute a signature according to one of the following algorithms SHA-1, SHA-160, SHA-256, SHA-512, MD5.

13. The device of claim 10, wherein each of the data blocks transmitted via the data bus has a size smaller than a maximum size.

14. The device of claim 10, wherein the data block identification data comprise at least one of an address of the data block in the system memory, a data block length, and a data block transfer direction.

15. The device of claim 10, further comprising:
a separate interface to transfer signatures from the result memory to the system memory.

16. The device of claim 10, further comprising:
a status register storing at least one of a number of processed data blocks and a number of computed signatures.

17. The device of claim 10, wherein
the system memory stores a signature table for receiving each signature stored in the result memory, and
each data block stored in the system memory corresponds with a signature stored in the signature table.

* * * * *